United States Patent
Eitouni et al.

(10) Patent No.: US 8,598,273 B2
(45) Date of Patent: Dec. 3, 2013

(54) HIGH IONIC CONDUCTIVITY ELECTROLYTES FROM BLOCK COPOLYMERS OF GRAFTED POLY(SILOXANES-CO-ETHYLENE OXIDE)

(75) Inventors: Hany Basam Eitouni, Oakland, CA (US); Bing R. Hsieh, Pleasanton, CA (US)

(73) Assignee: Seeo, Inc., Hayward, CA (US)

( * ) Notice: Subject to any disclaimer, the term of this patent is extended or adjusted under 35 U.S.C. 154(b) by 224 days.

(21) Appl. No.: 13/255,090

(22) PCT Filed: Feb. 26, 2010

(86) PCT No.: PCT/US2010/025690
§ 371 (c)(1),
(2), (4) Date: Sep. 6, 2011

(87) PCT Pub. No.: WO2010/101794
PCT Pub. Date: Sep. 10, 2010

(65) Prior Publication Data
US 2011/0318648 A1    Dec. 29, 2011

Related U.S. Application Data

(60) Provisional application No. 61/158,241, filed on Mar. 6, 2009.

(51) Int. Cl.
C08F 283/12    (2006.01)
(52) U.S. Cl.
USPC ........... 525/102; 525/100; 525/104; 525/105; 525/106; 525/431; 525/446; 525/477; 526/279; 252/519.31; 252/519.33
(58) Field of Classification Search
USPC ......... 525/100, 102, 104, 105, 106, 431, 446, 525/477; 526/279; 252/519.31, 519.33
See application file for complete search history.

(56) References Cited

U.S. PATENT DOCUMENTS

| | | | |
|---|---|---|---|
| 4,826,946 A * | 5/1989 | Eichenauer et al. | 528/14 |
| 4,851,216 A * | 7/1989 | Lee | 514/772.3 |
| 5,112,512 A | 5/1992 | Nakamura | |
| 5,144,054 A | 9/1992 | Shioya | |
| 5,196,484 A * | 3/1993 | Giles et al. | 525/314 |
| 5,407,593 A | 4/1995 | Whang | |
| 5,755,985 A | 5/1998 | Vallee | |
| 6,682,823 B2 | 1/2004 | Okada | |
| 7,026,071 B2 | 4/2006 | Mayes | |
| 7,101,643 B2 | 9/2006 | Kerr | |
| 2003/0180625 A1 | 9/2003 | Oh | |
| 2004/0069973 A1 * | 4/2004 | Keohan et al. | 252/500 |
| 2005/0019659 A1 | 1/2005 | Shiozaki | |
| 2005/0271948 A1 | 12/2005 | Kang | |
| 2006/0035154 A1 | 2/2006 | West | |
| 2006/0068296 A1 | 3/2006 | Nakagawa | |
| 2008/0206647 A1 | 8/2008 | Katsuyama | |
| 2012/0029099 A1 * | 2/2012 | Hsieh et al. | 521/31 |

OTHER PUBLICATIONS

C.V. Nicholas, D.J. Wilson, C. Booth and J.R.M. Giles. Br. Polym. J. 20 (1988), p. 289.
O. Buriez, Y. Han, J. Hou, J. Kerr, J. Qiao, S. Sloop, M. Tian, S. Wang, J. Power Sources 89 (2000) 149.
S. Pantaloni, S. Passerini, F. Croce, B. Scrosati, A. Roggero and, M. Andrei, Electrochim. Acta 34 (1989) 635.
Nagaoka et al., "High Ionic Conductivity in Poly(Dimethyl Siloxane-co-Ethylene Oxide) Dissolving Lithium Perchlorate," Journal of Polymer Science: Polymer Letters Edition, 22(12): 659-663, Dec. 1984.
H. Allcock, S. O'Connor, D. Olmeijer, M. Napierala, and C. Cameron, Macromolecules 29 (1996) 7544.
R. Hooper, L. Lyons, D. Moline, and R. West, Organometalics 18 (1999) 3249.
Zhang, "Network-Type Ionic Conductors Based on Oligoethyleneoxy-Functionalized Pentamethylcyclopentasiloxanes", Macromolecules 2005, 38, 5714-5720.
Li et al., "Ionic Conductivity of Methylsiloxane terminated Polyethylene Oxide with Lithium Perchlorate Network Films," Chinese Journal of Polymer Science, vol. 6, No. 4, 1988, p. 332-333.
Kohjiya et al., "Preparation of Copolymeric Gels Composed of Polydimethylsiloxane and Polyethylene Oxide Network Chains and Their Specific Characteristics," Bulletin of the Chemical Society of Japan, 71(4): 961-971, Apr. 1998, p. 962.

* cited by examiner

*Primary Examiner* — Margaret Moore
(74) *Attorney, Agent, or Firm* — R'Sue Popowich Caron

(57) ABSTRACT

Polymer electrolytes offer increased safety and stability as compared to liquid electrolytes, yet there are a number of new challenges that polymer electrolytes introduce. A polymer electrolyte, as disclosed herein, is a block copolymer that has a block that provides mechanical strength and a novel, ionically-conductive polymer block with a backbone that is both highly flexible and highly conductive with high conductivity pendant chains attached, thus increasing the concentration of lithium coordination sites and improving ionic conductivity. Previous strategies for comb-type conductive polymers have focused on attaching either conductive pendant chains to a flexible non-conductive backbone or conductive pendant groups to a marginally flexible conductive backbone.

16 Claims, No Drawings

HIGH IONIC CONDUCTIVITY ELECTROLYTES FROM BLOCK COPOLYMERS OF GRAFTED POLY(SILOXANES-CO-ETHYLENE OXIDE)

CROSS-REFERENCE TO RELATED APPLICATIONS

This application claims priority to International Patent Application PCT/US 10/25690, filed Feb. 26, 2010 and to U.S. Patent Provisional Application 61/158,241, filed Mar. 6, 2009, both of which are incorporated by reference herein. This application is also related to International Patent Application PCT/US10/25680, filed Feb. 26, 2010 and to U.S. Patent Provisional Application 61/158,257, filed Mar. 6, 2009, both of which are incorporated by reference herein.

BACKGROUND OF THE INVENTION

Field of the Invention

This invention relates generally to electrolytes for electrochemical cells, and, more specifically, to polymer electrolytes for lithium batteries.

Polymer electrolytes offer increased safety and stability as compared to liquid electrolytes, yet there are a number of new challenges that polymer electrolytes introduce. The primary limitation is in the ionic conductivity. Polymer chains in the electrolytes solvate ions and provide ion conduction through segmental motion. Thus considerable effort has been devoted to increasing the segmental motion of these solvating polymer chains. But as segmental chain motion is increased, the polymer becomes softer, which is an undesirable mechanical consequence. Block copolymers have been studied as a means of decoupling the mechanical and ion transport properties of a polymer electrolyte. In this approach Block A confers mechanical integrity while Block B provides ion conduction.

The most common polymer studied for use as an electrolyte is polyethylene oxide (PEO). Although PEO has good conductivity at high temperatures, its conductivity at low temperatures is extremely poor. Three common strategies have been employed with PEO-type polymers for increasing conductivity.

The first strategy is to prevent PEO from crystallizing. This can be done by altering the structure of the polymer to prevent or break down crystalline structures. One way to do this is by introducing oxymethylene groups into the PEO. Another way is by introducing polypropylene oxide groups or allyl glycidyl ether groups into the PEO.

The second method for improving conductivity is to incorporate side or pendant PEO chains that are attached to a polymer backbone. The pendant chains have increased flexibility compared to the original linear PEO backbone, which leads to increased segmental motion and ionic conductivity. Poly (oxyethylene methacrylates) and polyvinylethers are examples of useful pendant-containing polymer electrolytes.

The third common strategy for improving conductivity is to increase the flexibility and segmental motion of a polymer where pendant groups are not present. An example of such a linear system is poly(dimethyl siloxane-co-ethylene oxide) in which the siloxane units increase flexibility while the ethylene oxide units provide coordinating sites for lithium salts.

In all of the approaches to improve polymer conductivity described above, the polymers are limited in the concentration of lithium ion coordination sites because of backbone segments that are present only for structural reasons or because of potential sites that are taken up with bonding to side chains instead. It would be useful to have a polymer with an increased concentration of lithium coordination sites and improved ionic conductivity, which can be used as the B block in a block copolymer electrolyte with an A block that provides mechanical strength.

DETAILED DESCRIPTION

The preferred embodiments are illustrated in the context of electrolytes in a lithium battery. The skilled artisan will readily appreciate, however, that the materials disclosed herein will have application in a number of other contexts where ionic conduction is desirable, particularly where low volatility and high mechanical strength are important.

The embodiments of the invention, as disclosed herein, provide a block polymer material that can be mixed with an electrolyte salt and used as an electrolyte. The block copolymer has both a block that provides mechanical strength and a novel, ionically-conductive polymer block with a backbone that is highly flexible and highly conductive with high conductivity pendant chains attached. Previous strategies for comb-type conductive polymers have focused on attaching either conductive pendant chains to a flexible non-conductive backbone or conductive pendant groups to a marginally flexible conductive backbone.

In one embodiment of the invention, the block that provides mechanical strength is a glassy or semicrystalline polymer and may include a vinyl polymer. In one arrangement, the glassy or semicrystalline polymer contains one or more of the monomers ethylene, propylene, styrene, vinyl cyclohexane, vinyl prydine, alkyl acrylate, methyl acrylate, tetrafluroethylene, and acrylonitrile. In another arrangement, the glassy or semicrystalline polymer can be one or more of polydiene, polyamide, polyimide, polysilane, and polyester.

The block copolymers described here overcome many of the problems that have plagued previously-reported polymer electrolytes. The block copolymers have mechanical properties that allow the material to be processed easily and can prevent dendrite growth on lithium metal, yet still have high ionic conductivities at low temperatures.

Due to high power demands on lithium batteries, there is a strong need for polymer electrolyte materials with high ionic conductivity at room temperature. Known polymer electrolyte materials with high room temperature ionic conductivity include polysiloxanes and polyphosphazenes having oligomeric ethylene oxide pendant groups. The remarkable room temperature conductivity for these polymers has been ascribed to highly flexible inorganic backbones that produce an amorphous polymer matrix with a very low glass transition temperature ($T_g$). The backbone however does not coordinate lithium ions itself, reducing the total concentration of possible coordination sites. The structure of a polysiloxane with grafted oligomeric ethylene oxide pendant groups is shown as (1) below.

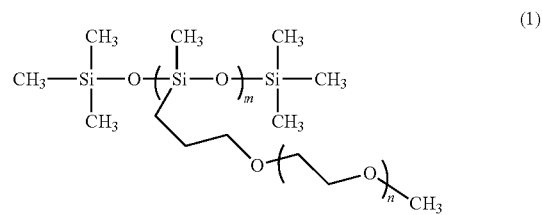

(1)

In one embodiment of the invention, the polymer shown as (2) below can be used as the conductive block in a block copolymer electrolyte. The silicon-containing groups are interspersed alternately between oligomeric PEO, but within the alternating sites, the silicon-containing groups are random (e.g., $S_1$—PEO—$S_2$—PEO—$S_2$—PEO—$S_1$—PEO—$S_2$—PEO—$S_1$). There can be any of a variety of R groups associated with each silicon-containing group. The polymer (2) has a lower $T_g$ than PEO and coordinates lithium ions better than the pure siloxane backbone shown above. The R groups in (2) represent variations of oligomeric ethylene oxide pendant groups or other coordinating groups such as highly polar groups, cyclic carbonate, nitrile groups, N-pyrrolidone groups, and perfluoroalkyl groups.

—$CH_3$

—$(CH_2)_3O$—$(CH_2CH_2O)_o$—$CH_3$

—$(CH_2)_2Si(CH_3)_2OSi(CH_3)_2$—$(CH_2)_3O$—$(CH_2CH_2O)_o$—$CH_3$

—$(CH_2)_2Si(CH_3)_2$—$(CH_2)_3O$—$(CH_2CH_2O)_o$—$CH_3$

—$(CH_2)_2Si(CH_3)_2$—O—$(CH_2CH_2O)_o$—$CH_3$ wherein o is an integer ranging from approximately 1 to 20.

Examples of materials that can be useful as the mechanical block include, but are not limited to, polystyrene, polymethylmethacyrlate, polybutylmethacrylate, polyvinylcyclohexane, polymethacrylate, polyvinylpyridine, polyimide, polyamide, and polypropylene.

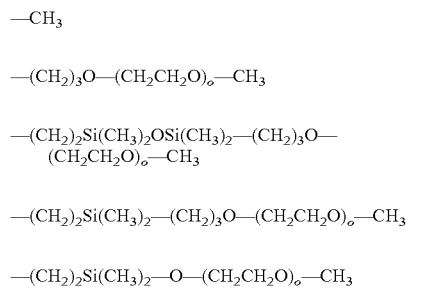

In one embodiment, the range of integer m is approximately 1 to 10. In one embodiment, the range of integer n is approximately 10 to 10000, and the range of integer p is approximately 1 to 10. $R_1$ and $R_2$ groups can be selected from, but are not limited to, the following groups:

In one exemplary embodiment of the invention, the novel block copolymer is made via a hydrosilylation condensation polymerization as shown in the following scheme:

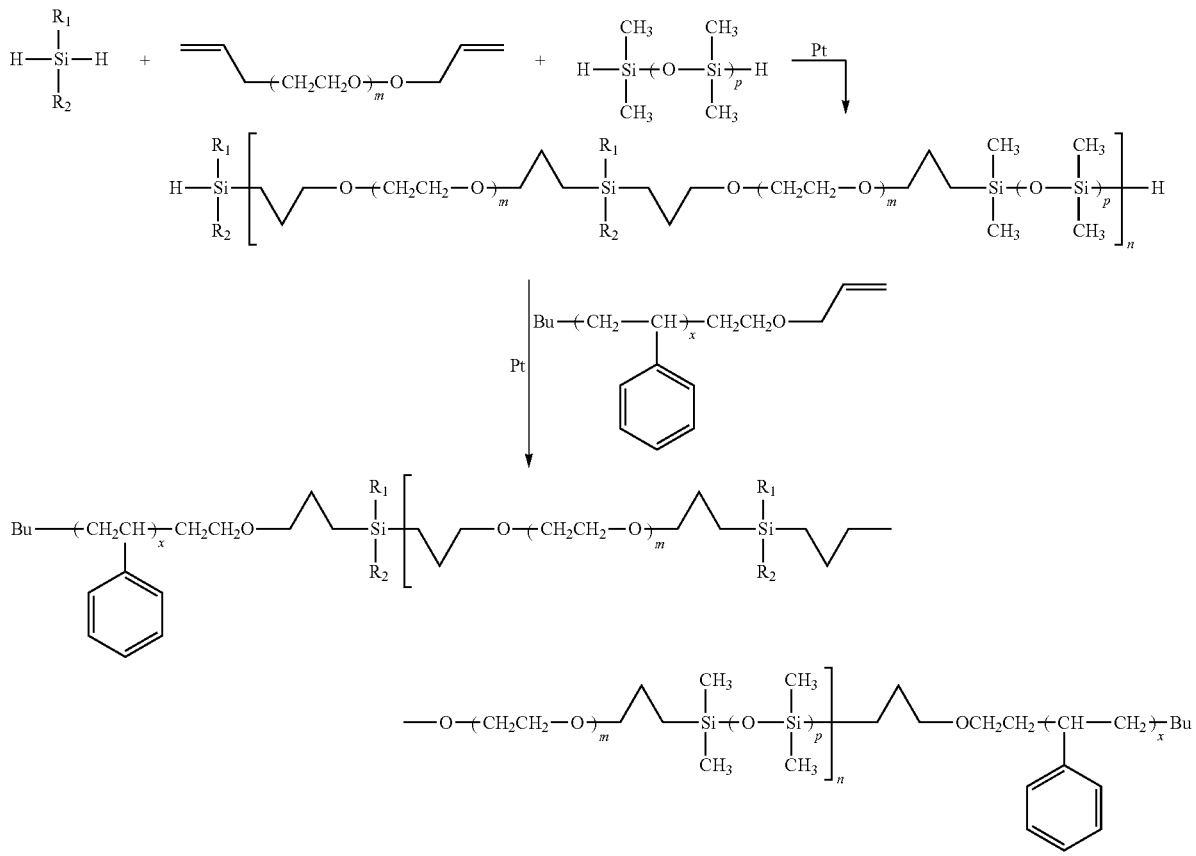

(3)

In one embodiment of the invention, the block copolymer material described above is combined with an electrolyte salt and is used as the electrolyte between an anode and a cathode in a battery cell. In some arrangements, the electrolyte can also be used in the anode and/or in the cathode. Some examples of useful electrolyte salts include $AgSO_3CF_3$, NaSCN, $NaSO_3CF_3$, KTFSI, NaTFSI, $Ba(TFSI)_2$, $Pb(TFSI)_2$, $Ca(TFSI)_2$, and mixtures thereof. In some arrangements, the electrolyte salt contains lithium. Some examples of useful lithium electrolyte salts include LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$), lithium alkyl fluorophosphates, lithium oxalatoborate, as well as other lithium bis(chelato)borates having five to seven membered rings, $LiPF_3(C_2F_5)_3$, $LiPF_3(CF_3)_3$, $LiB(C_2O_4)_2$, and mixtures thereof.

EXAMPLE

The example provides details relating to fabrication of novel polymer electrolyte (3) in accordance with embodiments of the present invention. It should be understood the following is representative only, and that the invention is not limited by the detail set forth in the example.

A three-neck round flask was equipped with a magnetic stirrer, two addition funnels, a nitrogen inlet, and a rubber septum. Sodium hydride (60% dispersion in mineral oil) (46 g, 1.15 mol) and then inhibitor-free tetrahydrofuran (500 ml) were added into the flask. Triethylene glycol monomethyl ether (156 ml, 0.976 mol) and allyl bromide (100 ml, 1.155 mol) were placed separately into each of the two addition funnels to await addition into the flask. The mixture was cooled with an ice-water bath, and then the triethylene glycol monomethyl ether was added dropwise from the funnel into the flask. The resulting mixture was stirred at room temperature for at least two hours. The mixture was cooled again with an ice-water bath before the allyl bromide was added dropwise from the funnel into the flask. The resulting mixture was stirred overnight at room temperature. The solid (mostly NaBr) that had formed in the mixture was removed by suction filtration. The solid was rinsed with tetrahydrofuran. The filtrate was concentrated in vacuo (rotavap followed by pump under vacuum) and then vacuum distilled (80-90° C.) to give triethylene glycol allyl methyl ether (4) as a colorless liquid.

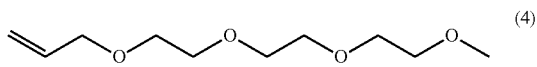

(4)

A flask was equipped with a magnetic stirrer and an addition funnel. Dichloro-methylsilane (400 ml, 3.84 mol) and toluene (300 ml) were added into the flask. Triethylene glycol allyl methyl ether (1) (81.6 g, 0.4 mol), toluene (100 ml), and platinum divinyltetramethyldisilane catalyst (2.1-2.4% platinum concentration) (0.25 ml) were placed in the addition funnel to await addition into the flask. The disiloxane solution was heated to 40° C., before adding the triethylene glycol allyl methyl ether solution dropwise. The resulting solution was heated to 50° C. for a total of 24 hours, cooled, and then concentrated in vacuo (rotavap followed by pump under vacuum). Under a nitrogen atmosphere, anhydrous tetrahydrofuran (300 ml ) was added to the flask and was cooled to 0° C. Lithium aluminum hydride solution (2 M in THF) was added dropwise and allowed to warm to room temperature. The solution was stirred for 8 hours. The solution was concentrated in vacuo (rotovap followed by pump under vacuum). The product (5) was then abstracted in toluene (200 ml).

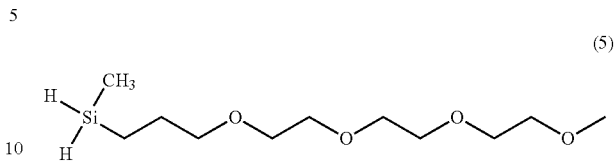

(5)

A three-neck round flask was equipped with a magnetic stirrer, two addition funnels, a nitrogen inlet, and a rubber septum. Sodium hydride (60% dispersion in mineral oil) (46 g, 1.15 mol) and then inhibitor-free tetrahydrofuran (500 ml) were added into the flask. Tetraethylene glycol (169 ml, 0.976 mol) and allyl bromide (100 ml, 1.155 mol) were placed separately into each of the two addition funnels to await addition into the flask. The mixture was cooled with an ice-water bath, and then the tetraethylene glycol was added dropwise from the funnel into the flask. The resulting mixture was stirred at room temperature for at least two hours. The mixture was cooled again with an ice-water bath before the allyl bromide was added dropwise from the funnel into the flask. The resulting mixture was stirred overnight at room temperature. The solid (mostly NaBr) that had formed in the mixture was removed by suction filtration. The solid was rinsed with tetrahydrofuran. The filtrate (6) was concentrated in vacuo (rotavap followed by pump under vacuum).

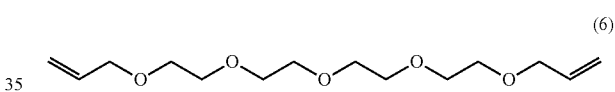

(6)

A flask was equipped with a stir bar and charged with tetrahydrofuran (300 ml). Ethylene oxide terminated polystyrene of molecular weight 50 kg/mol was added to the flask (200 g, 4 mmol) and stirred until dissolved. Sodium hydride (0.1 g, 4.2 mmol) was added to the solution and stirred for 12 hours at room temperature. Allyl bromide (0.48 g, 4 mmol) was added drop wise and allowed to react for 12 hours. The resulting polymer (7), which constitutes the mechanical block, was concentrated in vacuo (rotavap) and precipitated in hexane.

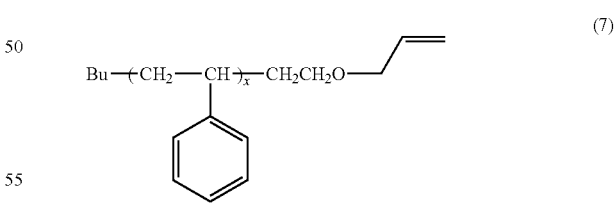

(7)

A flask was equipped with a magnetic stirrer and an addition funnel. 1,1,3,3-tetramethydisiloxane (40 g, 0.3 mol), 2HSiPEG (2) (75 g, 0.3 mol), and toluene (300 ml) were added into the flask. Tetraethylene glycol diallyl ether (3) (165 g, 0.6 mol), toluene (100 ml), and platinum divinyltetramethyldisilane catalyst (2.1-2.4% platinum concentration) (0.25 ml) were placed in the addition funnel to await addition into the flask. The disiloxane solution was heated to 60-70° C., before adding the tetraethylene glycol diallyl ether solution dropwise. The resulting solution was heated for a total of 24 hours. The resulting polymer (8) constitutes the conductive block of the block copolymer.

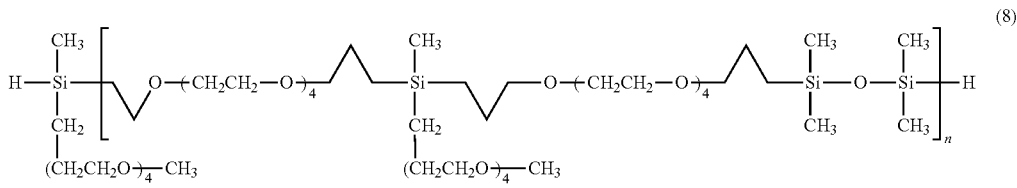

To the flask containing the conductive block (8), the allyl terminated polystyrene (200 g, 4 mmol) was added. The solution was heated to 60-70° C. and stirred for 48 hours. The resulting block copolymer (3) was concentrated in vacuo (rotovap) and precipitated in methanol.

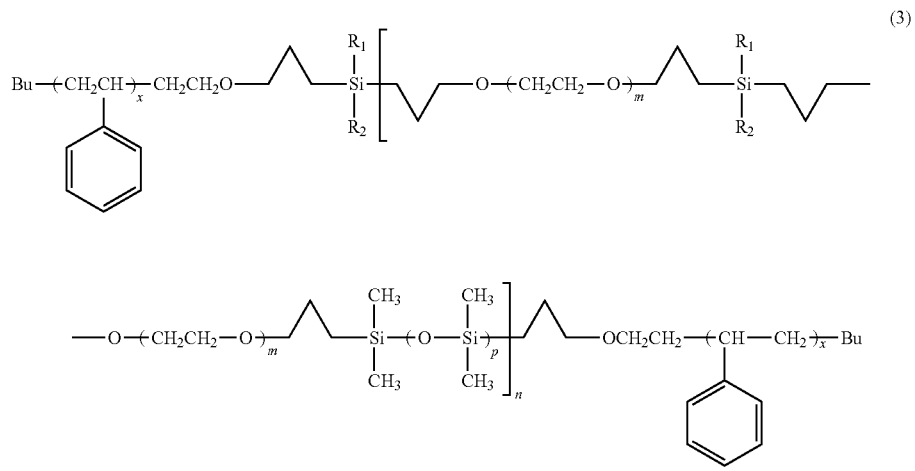

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A block copolymer, comprising:
   a first polymer block comprising a glassy or semicrystalline polymer; and
   a second polymer block comprising:
      oligomeric ethylene oxide groups; and
      silicon-based groups distributed in alternating positions between the oligomeric ethylene oxide groups;
   wherein at least some of the silicon-based groups have coordinating pendant groups.

2. The block copolymer of claim 1 wherein the glassy or semicrystalline polymer comprises a vinyl polymer.

3. The block copolymer of claim 2, wherein the vinyl polymer comprises one or more monomers selected from the group consisting of ethylene, propylene, stryrene, vinyl cyclohexane, vinyl pyridine, alkyl acrylate, methyl acrylate, tetrafluroethylene, and acrylonitrile.

4. The block copolymer of claim 3, wherein the vinyl polymer comprises polystyrene.

5. The block copolymer of claim 1 wherein the glassy or semicrystalline polymer comprises one or more selected from the group consisting of polydiene, polyamide, polyimide, polysilane, and polyester.

6. The block copolymer of claim 1 wherein the silicon-based groups comprise a first silicon-based group and a second silicon-based group different from the first silicon-based group.

7. The polymer of claim 6 wherein the first silicon-based group and the second silicon-based group are distributed randomly within the alternating positions.

8. The block copolymer of claim 6 wherein the first silicon-based group and the second silicon-based group each include at least one coordinating group selected independently from the group consisting of cyclic carbonates, nitrile groups, N-pyrrolidone groups, and perfluoroalkyl groups.

9. The block copolymer of claim 6 wherein the first silicon-based group has the following structure:

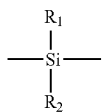

wherein the $R_1$ and the $R_2$ are each independently selected from the group consisting of:

—$CH_3$

—$(CH_2)_3O$—$(CH_2CH_2O)_o$—$CH_3$

—$(CH_2)_2Si(CH_3)_2OSi(CH_3)_2$—$(CH_2)_3O$—$(CH_2CH_2O)_o$—$CH_3$

—$(CH_2)_2Si(CH_3)_2$—$(CH_2)_3O$—$(CH_2CH_2O)_o$—$CH_3$ and

—$(CH_2)_2Si(CH_3)_2$—O—$(CH_2CH_2O)_o$—$CH_3$ wherein o is an integer ranging from approximately 1 to 20.

10. The block copolymer of claim 6 wherein the second silicon-based group has the following structure:

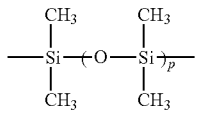

wherein p is an integer in the range of approximately 1 to 10.

11. A block copolymer comprising the following structure:

selected independently from the group consisting of ethylene carbonates, nitrile groups, N-pyrrolidone groups, and perfluoroalkyl groups.

12. The block copolymer of claim 11 wherein the $R_1$ and the $R_2$ are each selected independently from the group consisting of:

—$CH_3$

—$(CH_2)_3O$—$(CH_2CH_2O)_o$—$CH_3$

—$(CH_2)_2Si(CH_3)_2OSi(CH_3)_2$—$(CH_2)_3O$—$(CH_2CH_2O)_o$—$CH_3$

—$(CH_2)_2Si(CH_3)_2$—$(Ch_2)_3O$—$(CH_2CH_2O)_{o-CH3}$ and

—$(CH_2)_2Si(CH_3)_2$—O—$(CH_2CH_2O)_o$—$CH_3$ wherein o is an integer ranging from approximately 1 to 20.

13. An electrochemical device, comprising an electrolyte wherein the electrolyte comprises a polymer according to claim 1 and an electrolyte salt.

14. The device of claim 13 wherein the salt is selected from the group consisting of $AgSO_3CF_3$, NaSCN, $NaSO_3CF_3$, KTFSI, NaTFSI, $Ba(TFSI)_2$, $Pb(TFSI)_2$, $Ca(TFSI)_2$, and mixtures thereof.

15. The device of claim 13 wherein the electrolyte salt comprises lithium.

16. The device of claim 15 wherein the electrolyte salt is selected from the group consisting of LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$), lithium alkyl fluorophosphates, lithium oxalatoborate, as well as other lithium bis (chelato)borates having five to seven membered rings, $LiPF_3(C_2F_5)_3$, $LiPF_3(CF_3)_3$, $LiB(C_2O_4)_2$, and mixtures thereof.

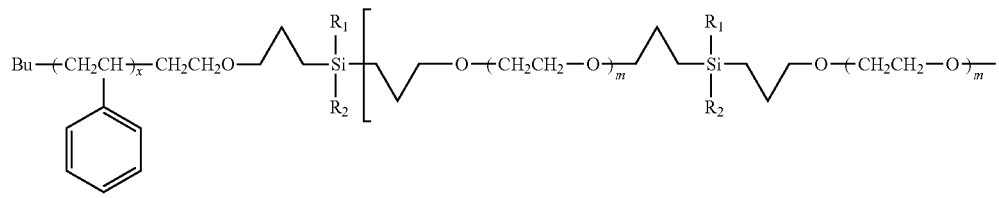

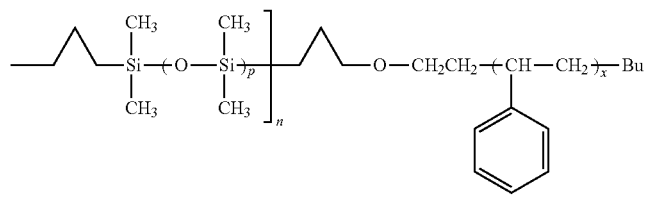

wherein m is an integer between approximately 1 and 10, n is an integer between approximately 10 and 10000, p is an integer between approximately 1 and 10, x has a value of approximately 480, and the $R_1$ and the $R_2$ are each

* * * * *